United States Patent
Akturan

(10) Patent No.: US 7,158,752 B1
(45) Date of Patent: Jan. 2, 2007

(54) METHODS AND SYSTEMS FOR PROVIDING GEOGRAPHIC SPECIFIC SERVICES TO RECEIVERS IN A SATELLITE COMMUNICATIONS NETWORK VIA SPECIFIC POSITION LOCATION AND INFORMATION TAGGING SCHEMES

(75) Inventor: Riza Akturan, North Bergen, NJ (US)

(73) Assignee: Sirius Satellite Radio, Inc., New York, NY (US)

( * ) Notice: Subject to any disclaimer, the term of this patent is extended or adjusted under 35 U.S.C. 154(b) by 250 days.

(21) Appl. No.: 10/244,952

(22) Filed: Sep. 17, 2002

(51) Int. Cl.
*H04H 1/00* (2006.01)
*H04H 7/00* (2006.01)
*H04Q 7/20* (2006.01)
*G01S 3/02* (2006.01)
*H04B 7/185* (2006.01)

(52) U.S. Cl. .............. 455/3.02; 455/3.06; 455/427; 455/456.1; 342/357.08; 342/465

(58) Field of Classification Search ........... 455/456.3, 455/456.1, 3.02, 3.04, 3.06, 427, 12.1, 67.1; 342/463, 465, 450, 357.08
See application file for complete search history.

(56) References Cited

U.S. PATENT DOCUMENTS

| | | | |
|---|---|---|---|
| 5,565,909 A * | 10/1996 | Thibadeau et al. | 455/4.2 |
| 5,969,679 A * | 10/1999 | Bolliger et al. | 342/464 |
| 6,169,894 B1 * | 1/2001 | McCormick et al. | 455/414.1 |
| 6,347,216 B1 * | 2/2002 | Marko et al. | 455/12.1 |
| 6,785,551 B1 * | 8/2004 | Richard | 455/456.1 |
| 2002/0086682 A1* | 7/2002 | Naghian | 455/456 |
| 2002/0183059 A1* | 12/2002 | Noreen et al. | 455/427 |
| 2003/0153329 A1* | 8/2003 | Stefan et al. | 455/456 |

FOREIGN PATENT DOCUMENTS

GB 2307812 A * 6/1997

* cited by examiner

*Primary Examiner*—Lester G. Kincaid
*Assistant Examiner*—Marisol Figueroa
(74) *Attorney, Agent, or Firm*—Patrick F. Bright

(57) ABSTRACT

Methods and systems for providing geographic specific services to receivers in a satellite communications network utilizes specific position location and information tagging to provide manual or automatic delivery of such services to the receivers.

4 Claims, 7 Drawing Sheets

(TDM2 Sirius Satellite Path) Differential delay patterns represented in bits, for the eight reference locations in the System Service Area, plotted as a function of the orbit period in minutes.

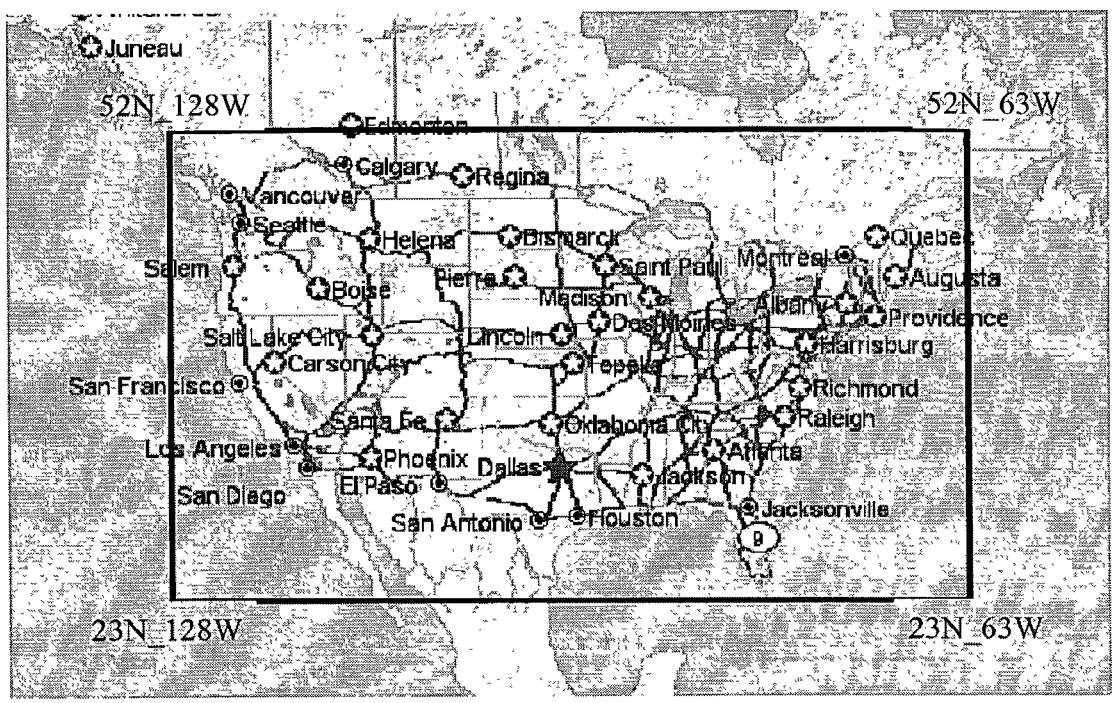
Figure 1 Example System Service Area covering the CONUS

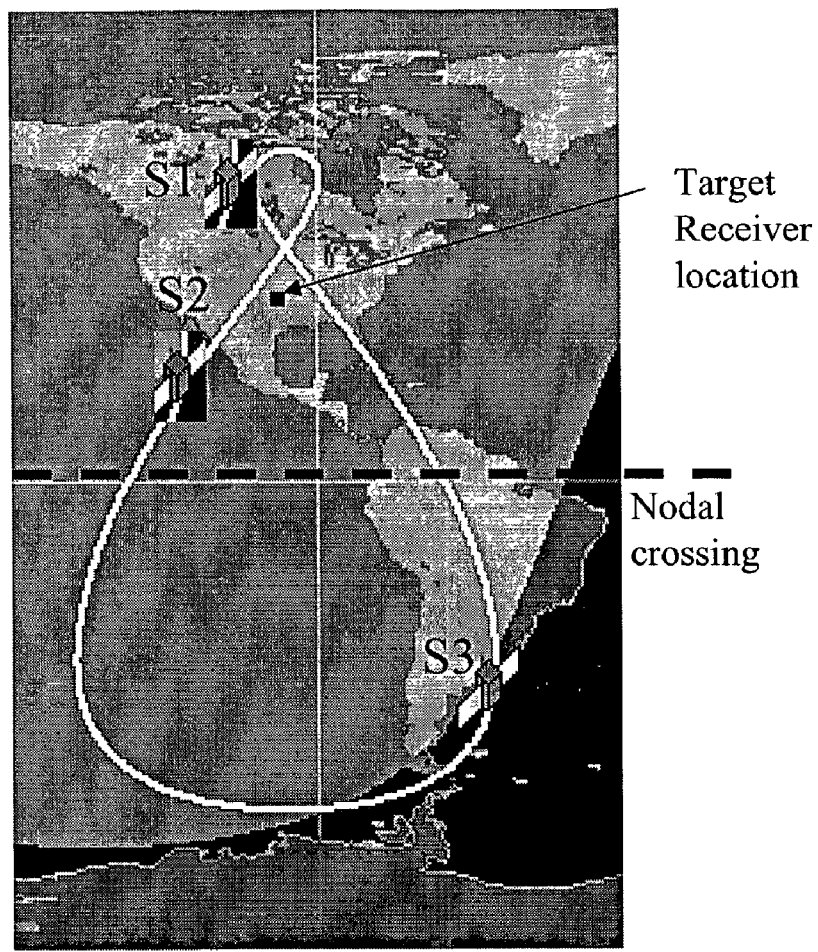
Figure 2 Orbital movement of the Sirius satellites over the System Service Area

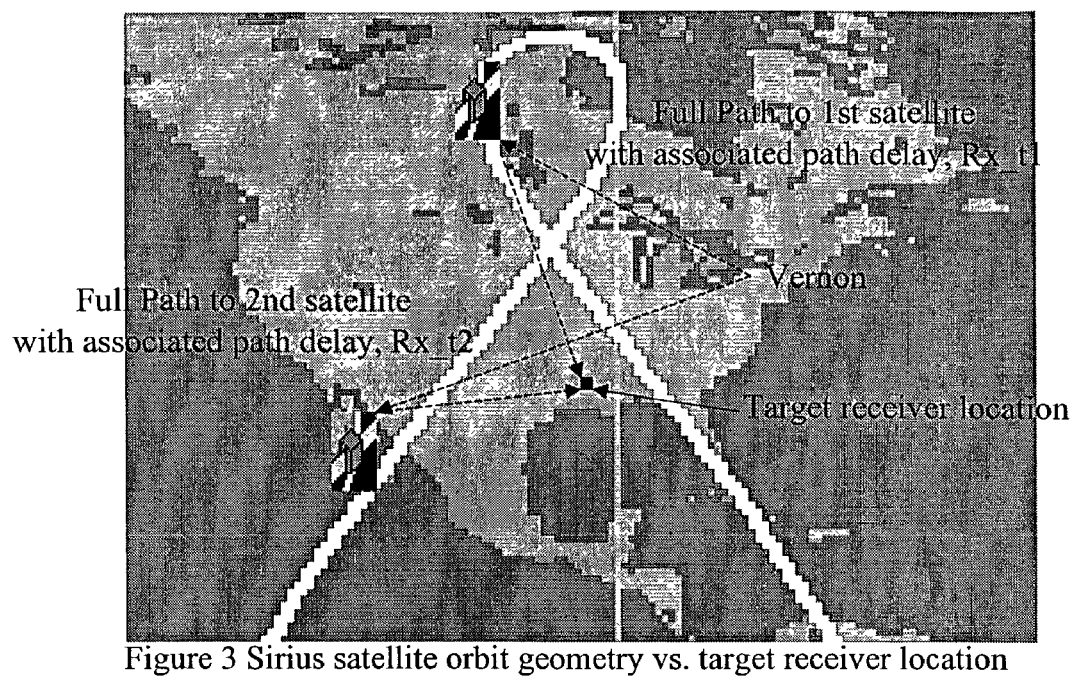
Figure 3 Sirius satellite orbit geometry vs. target receiver location

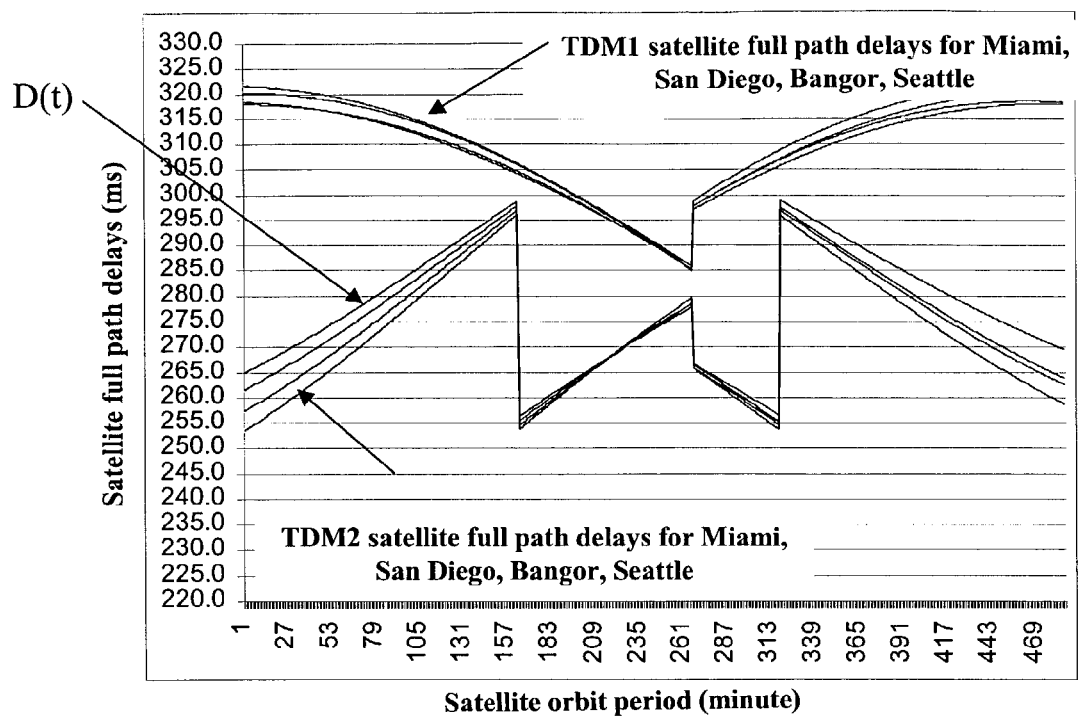
Figure 4 Plot of full path delays for the example CONUS corner locations, over an 8-hour satellite orbit period

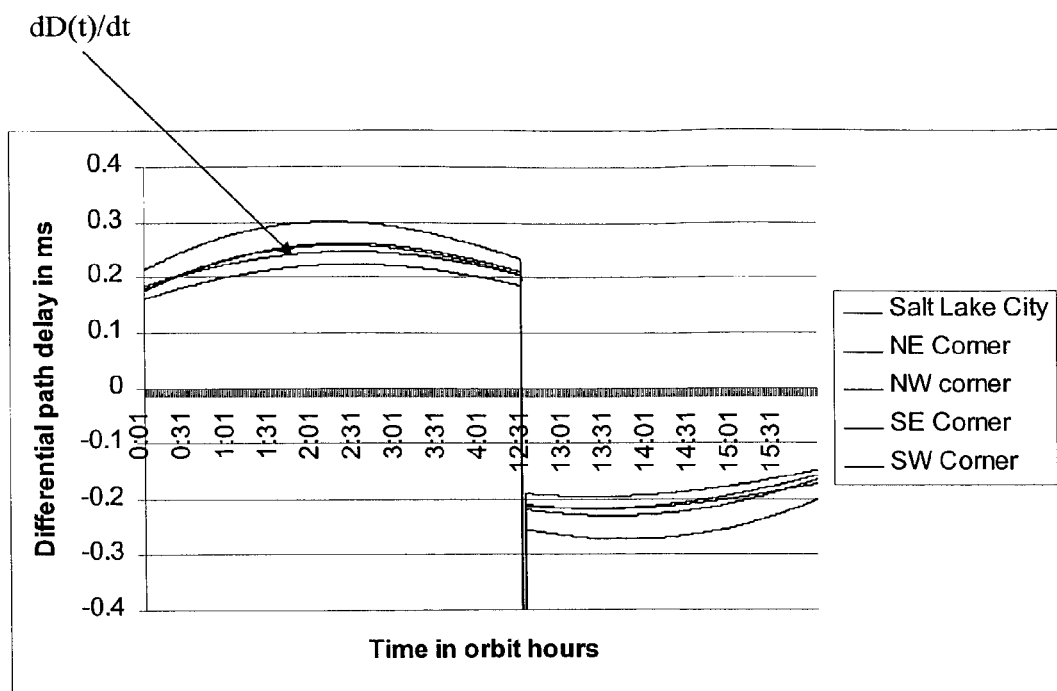
Figure 5 Differential Sirius TDM2 path delay patterns for an 8-hour orbit period for the four corners of the System Service Area and an example location of Salt Lake City, UT.

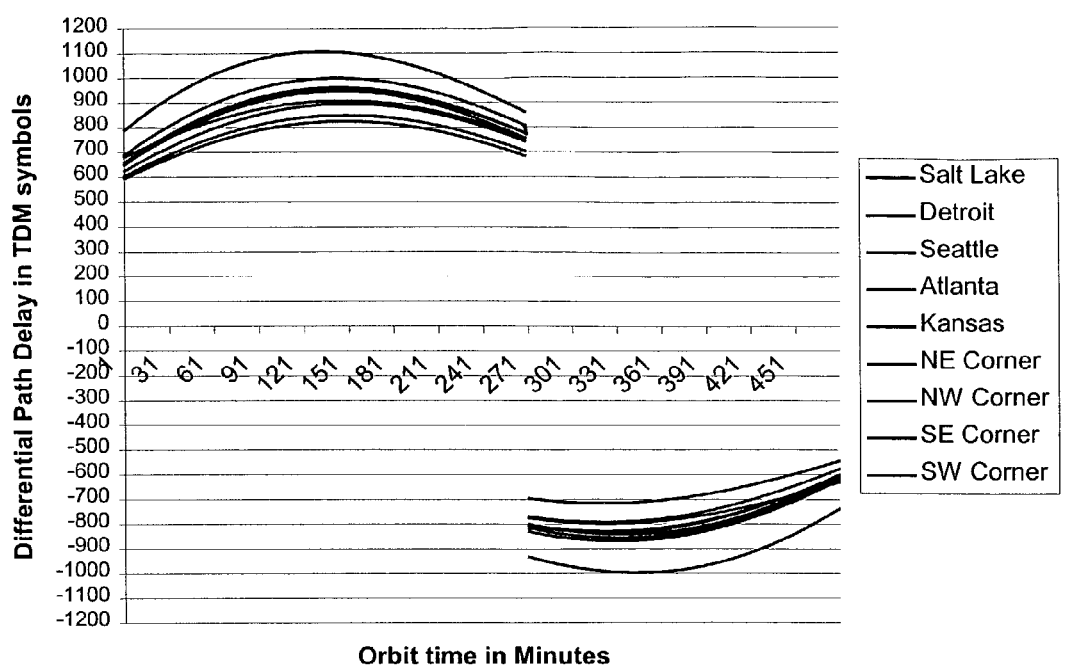
Figure 6 (TDM2 Sirius Satellite Path) Differential delay patterns represented in bits, for the eight reference locations in the System Service Area, plotted as a function of the orbit period in minutes.

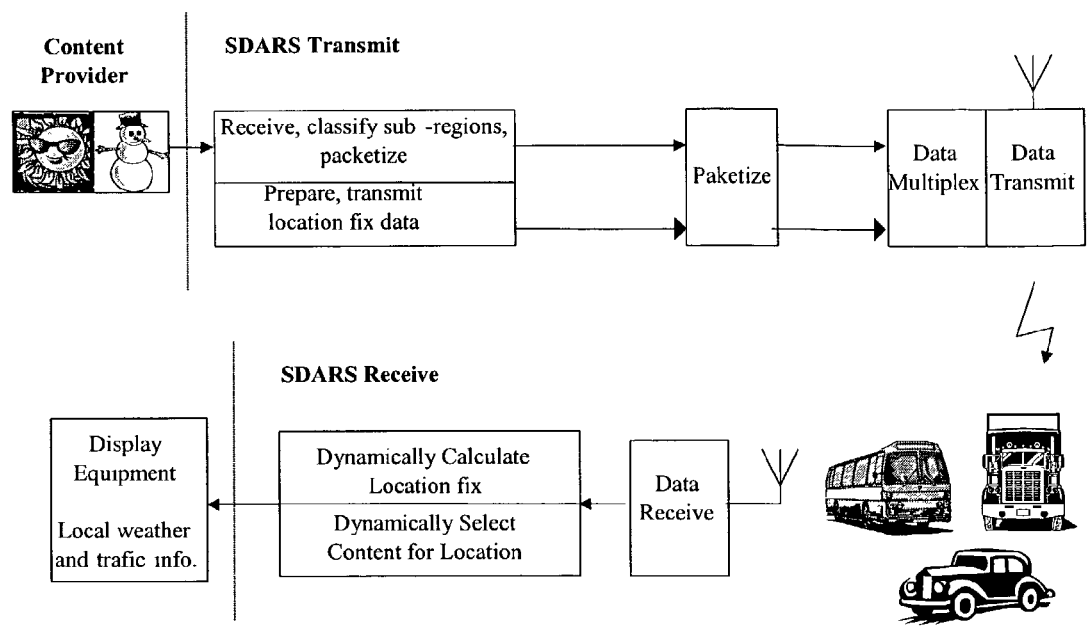
Figure 7 Illustration of the position location and local content delivery process.

METHODS AND SYSTEMS FOR PROVIDING GEOGRAPHIC SPECIFIC SERVICES TO RECEIVERS IN A SATELLITE COMMUNICATIONS NETWORK VIA SPECIFIC POSITION LOCATION AND INFORMATION TAGGING SCHEMES

This invention relates to methods and systems for providing geographic specific services to receivers in a satellite communications network. More particularly, this invention relates to methods and systems for providing geographic specific services portions in data signals transmitted to receivers in a satellite digital audio radio service (SDARS) network. These methods and systems preferably use the position location and content delivery methods described below. The methods comprise broadcasting, over the network, broadcast signals that include geographic specific services portions, preferably with the portions in packets with tags identifying each of the packets. These services provide information, or data, or both, for a specific, or local, service area within a larger system service area that receives the broadcast signals.

Satellite-based Direct Audio Radio Services (SDARS) (e.g. Sirius Satellite Radio) provide various broadcast content (i.e. audio and data) delivery services over a large system service area, e.g. CONUS (mainland United States). See FIG. 1. These services are broadcast to receivers at or near the surface of the earth in a target system service area from a geo-stationary or a non-geo-stationary satellite network with single or multiple satellite antenna service beams, also called broadcast signals. Delivery of local content as part of these broadcast signals, e.g. local weather or traffic information using the position location and content delivery methods described below from SDARS networks is an object of this invention.

SUMMARY OF THE INVENTION

These methods and systems are particularly useful in wireless transmission networks with one or more distinct signal delivery paths that have different path delays between the signal transmit point and signal receiver locations. These methods and systems are particularly useful in geo- and non-geo-stationary satellite systems with at least two satellite signal transmit paths, and in ground-based wireless communication systems with at least two signal transmit paths.

In one aspect, these methods and systems include receivers that are programmed manually with one or more tags that correspond to the tag(s) for desired geographic specific services portions in the system broadcast signals. This allows manual system operation. These receivers receive broadcast signals that include the tagged, geographic specific services, and match the receiver's tag(s) to the desired, correspondingly tagged, geographic specific services portion(s) in the broadcast signals.

Preferably, the geographic specific services portions are placed in packets, the packets are tagged to correspond to a particular local area, and the tagged packets are transmitted as part of the satellite network's broadcast signals to the network's system service area. To select particular geographic specific services from the satellite broadcast signals, a user programs a receiver with one or more desired local area tag(s) that identify the receiver's current location(s) in the system service area. The receiver preferably includes a memory, e.g. an internal memory, for this purpose. The receiver matches packet tags in the satellite broadcast signals with the receiver's chosen tag(s) to recover and display, record or play the desired geographic specific services portion(s) from the broadcast signals.

In another aspect, these systems and methods include receivers that determine what local service area (or exact location) they occupy. This allows automatic system operation with minimal user intervention. To determine their location(s), these receivers analyze path delay profiles of one or more broadcast signals from network satellites. The receivers measure and compare their own delay profile with reference delay profiles for locations within the system service area that are delivered continuously from the network. Preferably, this analysis comprises measuring and comparing a receiver's actual, measured, delay pattern(s) for one or more signals with the known delay patterns for local service areas within the larger service area, and then determining which local service area or areas are near to the receivers. Upon the determination of the receiver's local area or position, the receivers then look for, or monitor from the network, geographic specific services portions with the corresponding tags in received data signals. These known patterns are broadcast from the network to the receivers in the system service area. The receivers thereupon select the tagged geographic specific services corresponding to the tag(s) of the location(s) that the receivers have determined are their location(s), and, preferably, have stored in a memory In this second aspect, receivers may also, or alternatively, determine their locations more exactly, preferably by geometrical calculations, e.g. triangulation, among three or more nearby reference locations.

Incorporated by reference in their entirety here are the following documents that describe/refer to satellite communications networks and systems and methods for providing broadcast signals with geographic specific services portions to receivers of the kind referred to here:

U.S. Pat. No. 5,278,863, Radio Frequency Broadcasting Systems and Methods Using Two Low-Cost Geosynchronous Satellites, issued Jan. 11, 1994;

U.S. Pat. No. 5,319,673, Radio Frequency Broadcasting Systems and Methods Using Two Low-Cost Geosynchronous Satellites, issued Jun. 7, 1994;

U.S. Pat. No. 5,485,485, Radio Frequency Broadcasting Systems and Methods Using Two Low-Cost Geosynchronous Satellites and Hemispherical CoverageAntennas, issued Jan. 16, 1996;

U.S. Pat. No. 5,592,471, Mobile Radio Receivers Using Time Diversity to AvoidService Outages in Multichannel-Broadcast Transmission Systems, issued Jan. 7, 1997;

U.S. Pat. No. 5,3794,138, SatelliteBroadcast System Receiver, issued Aug. 11, 1998;

U.S. Pat. No. 6,023,616, Satellite Broadcast System Receiver, issued Feb. 8, 2000;

U.S. Pat. No. 6,223,019 B1, Efficient High Latitude Service Area Satellite Mobile Broadcasting Systems, issued Apr. 24, 2001;

International Publication No. WO 00/72493, Methods and Apparatus for Continuous Cross-Channel Interleaving, publication date 30 Nov., 2000;

International Publication No. WO 01/16840, Method and Apparatus for Providing Prepaid Music Card for Deciphering Recorded Broadcast Audio Signals, publication date 8 Mar., 2001;

International Publication No. WO 01/33720, Method and Apparatus for Selectively Operating Satellites in Tundra Orbits to Reduce Receiver Buffering Requirements for Time Diversity Signals, publication date 10 May, 2001;

International Publication No. WO 01/33729, Method and System for Providing Geographic Specific Services in a Satellite Communications Network, publication date 10 May, 2001;

International Publication No. WO 01/33737, Method and Apparatus for Concatenated Convolutional Encoding and Interleaving, publication date 10 May, 2001;

International Publication No. WO 01/33844, Method and Apparatus for Composite Data Stream Storage and Playback, publication date 10 May, 2001;

International Publication No. WO 01/84821, Glass-Mountable Antenna System with DC and RF Coupling, publication date 8 Nov., 2001.

BRIEF DESCRIPTION OF THE DRAWINGS

The systems and methods of this invention can better be understood by reference to the appended drawings in which:

FIG. 1, captioned "Example System Service Area covering the CONUS", shows an embodiment of a system service area, namely the CONUS;

FIG. 2, captioned "Orbital movement fo the Sirius satellites over the System Service Area", shows orbital movement of the Sirius satellites over the CONUS;

FIG. 3 shows Sirius satellite orbit geometry and target receiver location;

FIG. 4 shows a plot of full path delays for CONUS corner locations, over an 8-hour satellite orbit period;

FIG. 5, captioned "Differential Sirius TDM2 path delay patterns for an 8-hour orbit period for the four corners of the System Service Areas and an example location of Salt Lake City, Utah.", shows Sirius TDM2 differential path delay patterns for an 8-hour orbit period for the four corners of the system service area and for a receiver located in Salt Lake City, Utah;

FIG. 6, captioned (TDM2 Sirius Satellite Path) Differential delay patterns represented in bits, for the eight reference locations in the System Service Area, plotted as a function of the orbit period in minutes", shows TDM2 Sirius satellite path differential delay patterns represented in bits, for eight reference locations in the system service area, plotted as a function of the orbit period in minutes; and FIG. 7 is an illustration of the position location and local content delivery process.

DESCRIPTION OF PREFERRED EMBODIMENTS

These systems and methods are useful in the Sirius satellite network. FIG. 2 illustrates the orbital movement of the Sirius satellites over the CONUS. At a given time, at least two of the three Sirius satellites are north of the equator, and only two satellites transmit signals to receivers located in the system service area, here CONUS. These signals are at two different frequencies, called TDM1 and TDM2, and are approximately 4.2 MHz wide, placed at 2.3 GHz frequency band.

FIG. 3 illustrates the signal path from an uplink station to the two Sirius satellites, and then to one or more receivers in the system service area. The receivers experience different signal path delays from the two satellite transmitters because of the different orbital locations of the two transmitting satellites. In FIG. 3, "t1" and "t2" refer to full path delays of the satellites transmitting at the TDM1 and TDM2 frequencies. "Rx" refers to the full path delay measurement made at the receiver. Full path delay is the sum of the path delay between the uplink station and a satellite, plus the path delay between the satellite and a receiver.

In FIG. 4, satellite path delays are plotted for sample receiver locations in the system service area, for both satellites transmitting signals at TDM1 and TDM2 frequencies, and for an 8-hour satellite orbit period. Example receiver locations here are the four conceptual corners of the system service area, and are near Miami, FL; San Diego, Calif.; Bangor, Me.; Seattle, Wash. As FIG. 4 shows, each location experiences a different delay pattern at a given time because of the different path distances between the satellites and the locations.

Preferably, in both aspects of this invention, broadcast signals are delivered to receivers in a digital frame format. Digital signal states in frames may be represented by bits. The digital frames are generated at the broadcast network, and transmitted to one or more satellites from a common transmit interface via one or more distinct wired or wireless paths. The full path delay may therefore alternatively be defined as the difference between the time that the first bit in a frame is transmitted from the broadcast network's common transmit interface, and the time that this bit is received at a receiver.

Preferably, when a signal (frame) is received at a receiver, the receiver stores the received frame bits in its memory buffer. Each frame starts and ends with a common bit pattern that identifies the boundaries of the frame. The receiver identifies the start and end of the frames using this common bit pattern. The receiver processes the contents of the frame to produce audio or data as an output.

Because of satellite movement, and the resulting changes in satellite path delays, the location of the frame in the memory buffer moves forward or backward in time. See FIG. 4. This movement in the memory buffer can be measured by the location change of the start bit of the frame, and may be mathematically represented by the first derivative of the full satellite path delay in time.

FIG. 5 represents the first derivative or differential path delay for the four SDARS service area corner locations depicted in FIG. 4. Differential delays for TDM2 link only are plotted in FIG. 5. Differential path delays for the TDM1 link can be plotted in the same way. To generate the differential path delay patterns in FIG. 5, the full path delay patterns shown in FIG. 4 were varied in 1-minute increments, but the increment length itself can be larger, e.g. 2 minutes, or smaller, e.g. 30 seconds.

FIG. 5 includes the differential full path delay for a receiver in Salt Lake City, Utah. This receiver repeatedly receives the composite differential delay patterns from the broadcast network, and calculates its location's composite differential delay patterns for the TDM1 and TDM2 links. This receiver then compares its own measured composite differential delay patterns to the composite differential delay patterns of a larger number, e.g. 100, of reference locations provided by the broadcast network in the broadcast (or data) signals over a channel such as a position location data channel. This comparison may, in some embodiments, comprise calculating mean-square differences between a receiver's measured composite differential delay patterns and the patterns of a larger number (e.g. 100) reference locations transmitted from the network.

The reference location(s) with the lowest composite differential delay pattern(s) difference may then be declared as "nearest" to the receiver's location. The receiver may then finalize the position location process by assuming the coordinates of the "nearest" reference location(s) as its coordinates.

To measure its differential delay pattern, a receiver measures the time shift of frames in its memory buffer dynamically. The receiver may measure the differential delay time directly, or may instead determine the number of bits that the start bit of a frame moved in its memory buffer during the differential delay measurement time. Thus, a receiver may measure the differential path delay in terms of TDM signal bit duration.

For Sirius's TDM1 and TDM2 links, the bitrate is 7.5 Mbps. Thus, one bit duration is approximately 133 nanoseconds. As a result, a receiver's measurement of differential path delay can be 133 ns in error, as the frame can be placed early or late by one bit in the memory buffer. Using the speed of light as a measure to convert time to distance, this results in a minimum 40-meter position location error boundary.

FIG. 6 shows the known TDM2 Sirius satellite path delay for Salt Lake City, Detroit, Seattle, Atlanta, Topeka (Kans.) and the four corners of the SDARS service area for an 8-hour orbit period, as the differential path delay patterns is represented in bits. A similar plot can be readily derived for TDM1.

In FIG. 6, the instantaneous differential delay pattern is different for each target receiver location in the system service area. In general, as FIG. 6 shows, each location in the system service area has a unique, known differential delay pattern. The network determines the selected location differential delay patterns automatically, and sends these patterns to receivers with the broadcast signals.

A receiver can measure its differential delay pattern for TDM1 and TDM2 signals (for its location as a function of time). A set of two measurements for TDM1 and TDM2 may be denoted as a "composite measurement". By comparing differential delay patterns of selected locations in the network's broadcast signals to a receiver's own differential delay pattern measurements, a receiver can determine its probable location.

In a preferred embodiment, an SDARS network operator selects 50 high population markets (cities/localities) in its system service area. These may be denoted Primary Reference Points. The SDARS operator can then designate 50 Secondary Reference Points in the system service area, for a total of 100 reference points. Four of these reference points are at the corners of the system service area.

The network operator calculates the composite differential delay patterns for those 100 reference points as a function of time. As an example, the differential delay calculation time may be made in increments of 1 minute. Higher increment values provide more accurate differential delay patterns. Lower values provide more frequent composite differential delay pattern generation.

The network continuously transmits the reference point composite differential delay patterns and related tags to all receivers in its system service area, preferably over a designated position location data channel. The network may also transmit the latitude and longitude coordinates of reference locations so that a receiver can determine its coordinates after identifying the nearest reference locations' coordinates. The network may also transmit the GMT time so that a receiver can determine its local time after locating its position. The network may also transmit the cyclical orbit time for a receiver to determine the satellite locations in order to give the receiver an understanding of the orbital state of the satellite system. Transmission of this information occurs over a selected transmission time interval, e.g. 10 seconds to one minute. Lower transmission time intervals increase frequency of position location fixes. Higher values reduce position location data channel bandwidth consumption.

Composite differential delay patterns include two differential delay patterns: one from the TDM1 signal, and another from the TDM2 signal. Using both TDM signals enhances position location accuracy. At times, one or both of the TDM signals may be unavailable. At such times, the differential delay pattern from only one TDM signal may be used for position fix. Or the most recent position location fix may be assumed valid if both TDM signals are unavailable.

See FIG. 7. On the network side, an information content provider dynamically sends local content to the SDARS broadcast operator in data packets. Each packet carries geographic specific services for a local area, e.g. local weather, traffic information, local time and date, and the receiver's longitude and latitude. SDARS operator classifies the data packets into selected markets, and tags each data packet accordingly. The tag carries the coordinates of its selected market, and a market ID. The resulting packets can be called "Local Info Packets". The SDARS network then broadcasts the Local Info Packets as part of the broadcast signals to all receivers in its system service area.

The receivers repeatedly determine their locations, and observe the Local Info Packets received in the system's broadcast signals. When a Local Info Packet carrying coordinates that match a receiver's calculated coordinates reach a correspondingly tagged receiver, the matching Local Info Packet is delivered from the receiver via a display unit or a data port.

Alternatively, the receiver can calculate its actual location by making a geometrical position location calculation among the "nearest" locations. For example, knowledge of the positions of the nearest three locations would enable the receiver to make a position location by geometric triangulation method. In this process, the receiver determines its location as residing in a triangle among the three nearest reference locations, whose coordinates and differential delay patterns are transmitted from the broadcast network. The receiver weights the differential delay patterns for these three with regard to their coordinates.

The receiver may repeat the position location process to refine its position location fix by each new fix, e.g. by keeping a hysteresis of old position fixes, or by renewing its current location fix with each new position fix.

What is claimed is:

1. A communications method comprising the steps:
continuously transmitting to a plurality of receivers in a target service area one or more data signals from a transmitters on a plurality of satellites deployed in a digital audio radio service network, said one or more data signals comprising a plurality of data channels, at least one of said data channels comprising at least one geographic specific information portion for locations in said target service area, said receivers having one or more probable locations in said target service area and having a constant or time-varying delay pattern for said one or more data signals;
receiving said data signals at said receivers;
continuously comparing said receivers' delay patterns for said one or more data signals with known delay patterns for a plurality of actual locations in said target service area that are delivered with said one or more data signals to said receiver;
determining said receivers' actual or probable locations in said target service area from said comparing step; and selecting, in said receivers, and outputting from said receivers, said at least one geographic specific information portions for said locations.

2. The method of claim 1 further comprising selecting a plurality of reference points within said target service area, and determining, for each of said reference points, delay patterns for said one or more data signals from said transmitter to said plurality of reference points to determine a plurality of said known delay patterns.

3. The method of claim 1 or claim 2 further comprising determining the differential delay patterns from said transmitter to said reference points from one or more separate data signals transmitted over one or more different paths to said receivers.

4. The method of claim 3 further comprising, in said determining step, using identified positions of a receiver's nearest reference locations to determine the receiver's exact location by geometrical calculation.

* * * * *